A. HARROLD.
STEERING DEVICE FOR TRACTION ENGINES.
APPLICATION FILED MAY 9, 1908.
914,951.
Patented Mar. 9, 1909.
3 SHEETS—SHEET 1.
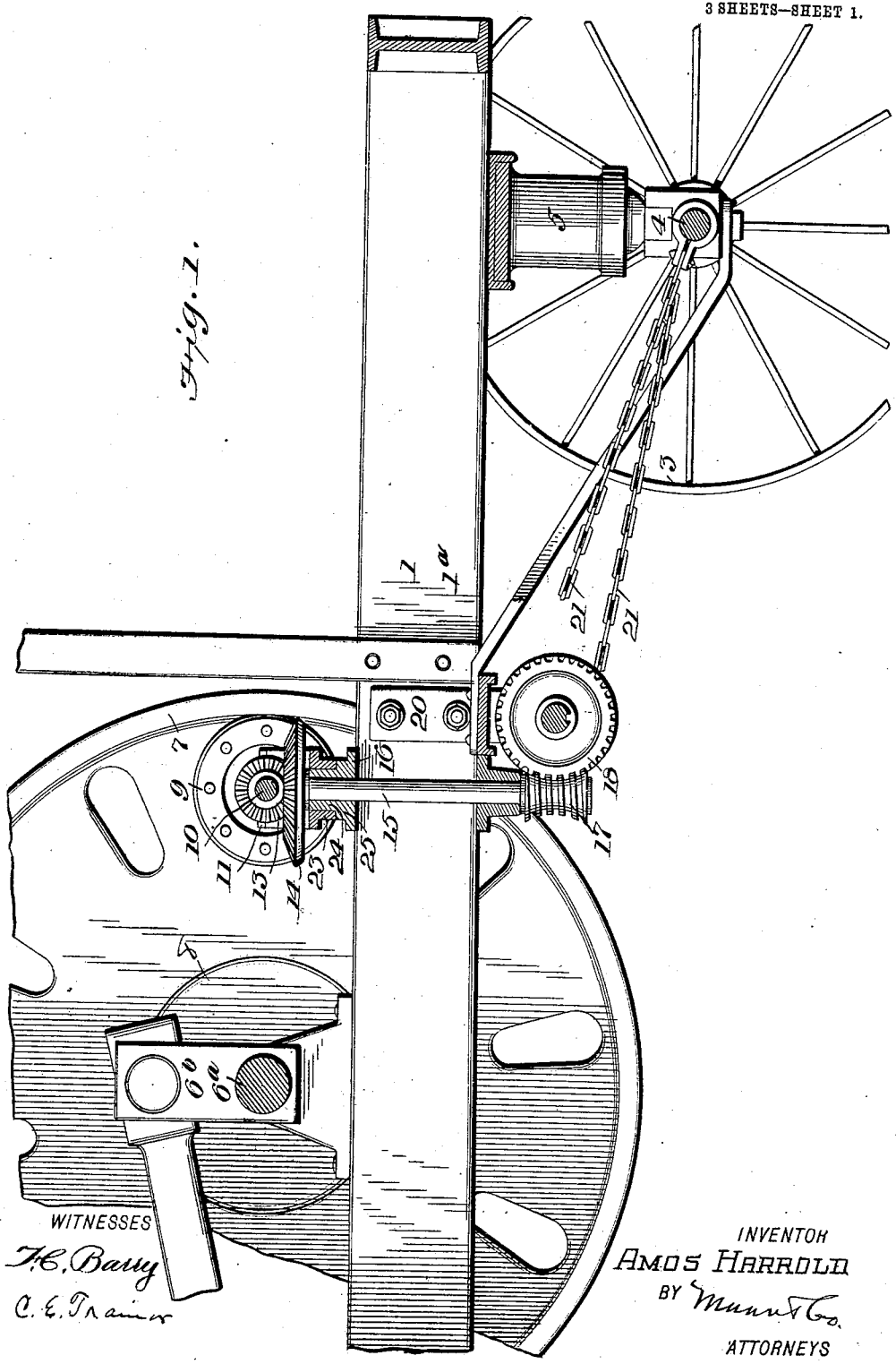
WITNESSES
F.E. Barry
C.E. Trainor
INVENTOR
AMOS HARROLD
BY Munn & Co.
ATTORNEYS

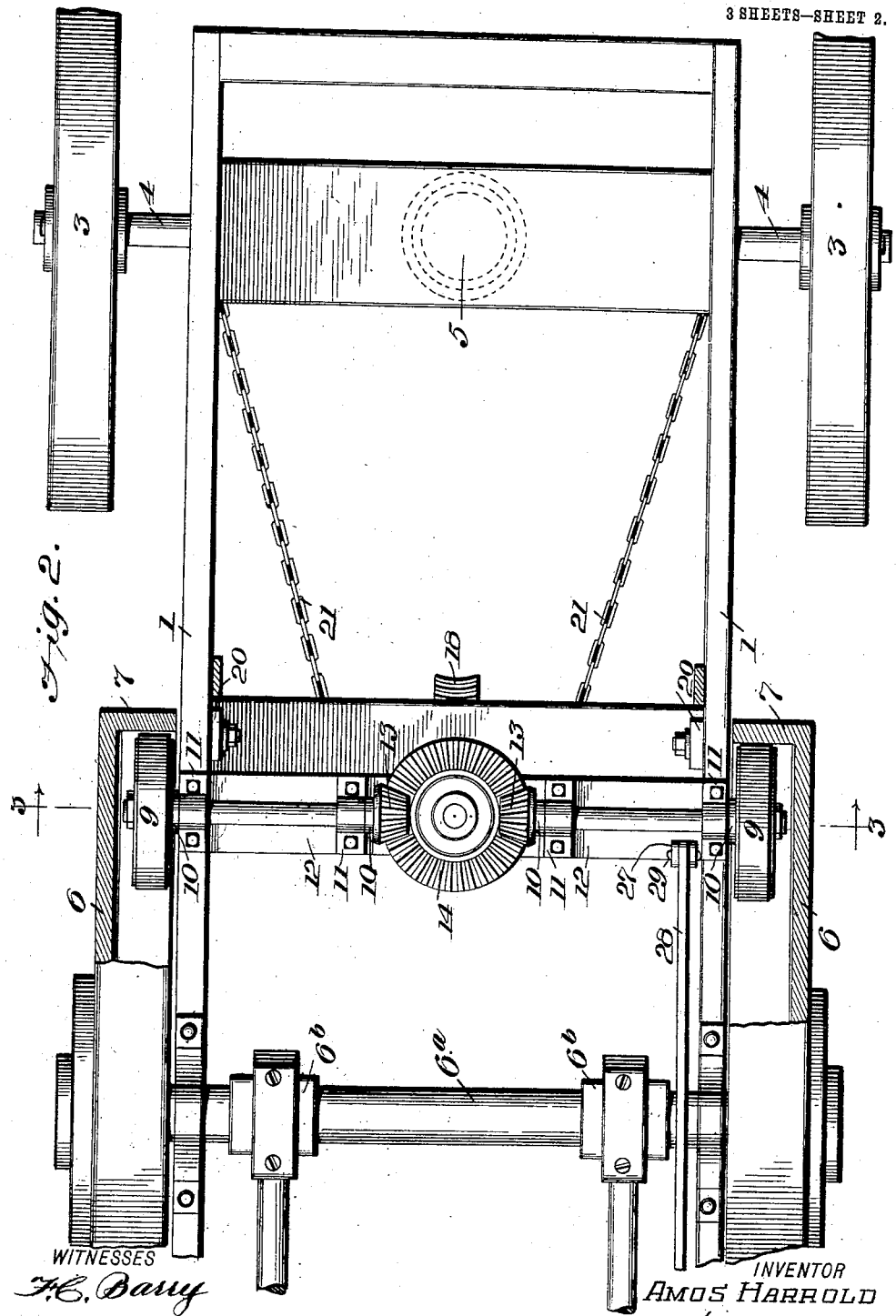

A. HARROLD.
STEERING DEVICE FOR TRACTION ENGINES.
APPLICATION FILED MAY 9, 1908.
914,951.
Patented Mar. 9, 1909.
3 SHEETS—SHEET 3.
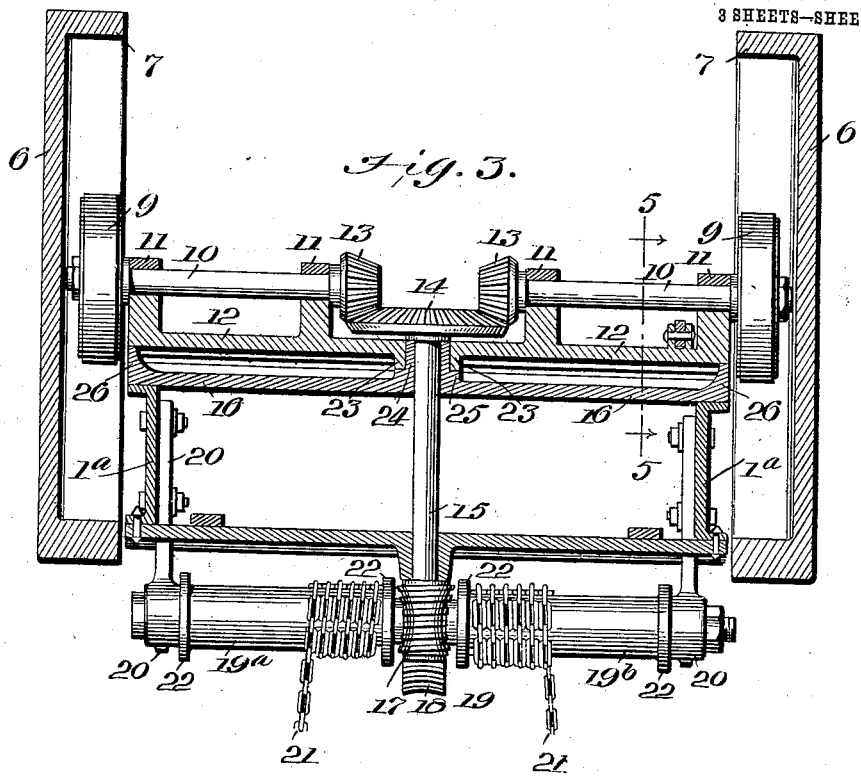
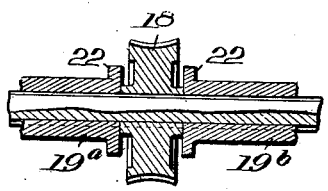
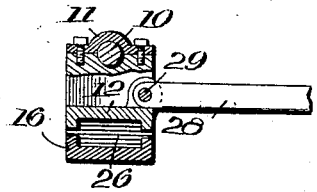
WITNESSES
F.C. Barry
C.E. Trainor
INVENTOR
AMOS HARROLD
BY Munn & Co.
ATTORNEYS

UNITED STATES PATENT OFFICE.

AMOS HARROLD, OF LIMA, OHIO.

STEERING DEVICE FOR TRACTION-ENGINES.

No. 914,951.      Specification of Letters Patent.      Patented March 9, 1909.

Application filed May 9, 1908. Serial No. 431,791.

*To all whom it may concern:*

Be it known that I, AMOS HARROLD, a citizen of the United States, and a resident of Lima, in the county of Allen and State of Ohio, have made certain new and useful Improvements in Steering Devices for Traction-Engines, of which the following is a specification.

My invention is an improvement in steering devices for traction engines, and consists in certain novel constructions and combination of parts hereinafter described and claimed.

Referring to the drawings forming a part hereof—Figure 1 is a longitudinal section through a part of a traction engine provided with my improvement; Fig. 2 is a plan view; Fig. 3 is a section on the line 3—3 of Fig. 2; Fig. 4 is a partial longitudinal section of the drum; and Fig. 5 is a section on the line 5—5 of Fig. 3.

In the present embodiment of my invention, the engine comprises the usual framework 1, supported by the rear wheels not shown and the front wheels 3, the former being the traction wheel, and the latter being journaled on a shaft 4 which is oscillatable about a fixed axis 5 in the usual manner.

A pair of fly wheels 6 are driven by the engine in the usual manner, the shaft $6^a$ on which the wheels are mounted being journaled at approximately the center of the frame, and each of said wheels is provided with a marginal annular flange 7, and a hub 8, and between the rim and the hub is mounted a wheel 9, composed usually of superimposed sheets of paper, whereby to provide an efficient friction surface between the periphery of said wheel and the internal face of the flange.

The wheels 9, are secured to shafts 10, journaled in bearings 11, on a plate 12 to be presently described, and the shafts 10 are in alinement with each other, and are provided on their inner ends with bevel gears 13. The bevel gears 13 mesh with a bevel gear 14, secured to a vertical shaft 15 which is journaled in a bracket 16 supported by the side plates $1^a$ of the frame, and the lower end of the shaft is provided with a worm 17 meshing with a worm-wheel 18, on a drum 19, journaled in brackets 20 depending from the side plates $1^a$ before mentioned.

Chains 21 are connected with the front axle near their outer ends, and wind upon the drum 19, one chain winding in one direction and one in the other in the usual manner, the said drum being divided into two portions $19^a$ and $19^b$ each of which is flanged at its ends as at 22, for retaining the chain in place.

The plate 12 before mentioned, in which the shafts 10 are journaled is provided at its center with a hub 23, for receiving a hollow pin 24 encircling the shaft 15, and the bracket 16 is provided with a shoulder 25 against which the edge of the hub rests. The sides of the bracket are provided with tracks or rails 26, for supporting the outer edges of the plate 12, which as will be seen is rotatably mounted on the said bracket.

The plate 12 is provided with a pair of spaced lugs 27, between which is received the end of a lever 28, the lever being connected to the lugs by a bolt 29, and the said lever extends to a point adjacent the driver of the engine, in order that he may manipulate the same to swing the plate on the bracket.

When the plate is swung in one direction, the friction wheel on one side will engage the rim, thus rotating the drum in one direction, while a reverse movement of the plate will rotate the drum in the other direction.

The shaft $6^a$ is provided with a cranked portion $6^b$, to which are attached the piston rods of the engine in the usual manner.

I claim:

1. In a traction engine steering device, the combination with the steering drum of a worm-wheel secured thereto, a vertical shaft provided with a worm engaging the worm-wheel, and with a bevel gear, a bracket provided with a hub in which the shaft is journaled, a plate journaled on the hub and rotatable on the bracket, a pair of alined horizontal shafts journaled on the plate and arranged on opposite sides of the gear wheel, each of said shafts being provided with a bevel gear meshing with the bevel gear on the vertical shaft, a friction disk on the outer end of each of said shafts, a fly wheel provided with a marginal flange adjacent to each friction disk and driven by the engine, and means for swinging the plate whereby to bring either disk into contact with the marginal flange of the adjacent fly wheel.

2. In a traction engine steering device, the combination with the steering drum, of a worm-wheel secured thereto, a vertical shaft provided with a worm engaging the worm-wheel and with a bevel gear, a pair of alined shafts arranged on opposite sides of the gear wheel, each of said shafts being provided with a bevel gear meshing with the bevel gear of the vertical shaft, means for supporting said shafts whereby to permit them to oscillate around the vertical shaft, a disk on the outer end of each of said shafts, a fly wheel provided with a marginal flange adjacent to each friction disk and driven by the engine, and means for oscillating said shafts whereby to bring either disk into contact with the marginal flange of the adjacent fly wheel.

3. In a traction engine steering device, the combination with the steering drum of a worm-wheel secured thereto, a vertical shaft provided with a worm engaging the worm-wheel and with a bevel gear, a pair of alined shafts arranged on opposite sides of the bevel gear, each of said shafts being provided with a bevel gear meshing with a bevel gear of the vertical shaft, means for supporting said shafts whereby to permit them to oscillate around the vertical shaft, a fly wheel driven by the engine adjacent to the outer end of each shaft, and means for oscillating the shafts whereby to engage either shaft with the adjacent fly wheel.

4. In a traction engine steering device, the combination with the steering drum, of a worm-wheel secured thereto, a vertical shaft provided with a worm engaging the worm-wheel, a pair of alined shafts arranged on opposite sides of the vertical shaft, and having a driving connection therewith, means for supporting said shafts whereby to permit them to oscillate around the vertical shaft, a fly wheel driven by the engine adjacent to the outer end of each shaft, and means for oscillating the shafts whereby to engage either shaft with the adjacent fly wheel.

5. In a traction engine steering device, a steering drum, a vertical shaft having a driving connection therewith, a pair of alined shafts arranged on opposite sides of the vertical shaft and having a driving connection therewith, means for supporting said shafts whereby to permit them to oscillate around the vertical shaft a fly wheel driven by the engine adjacent to the outer end of each shaft, and means for oscillating the shafts whereby to engage either shaft with the adjacent fly wheel.

6. In a traction engine steering device, a steering drum, a pair of alined shafts each having a driving connection with the steering drum a fly wheel driven by the engine adjacent to the outer end of each of said alined shafts, and means for moving the shafts whereby to engage either with the adjacent fly wheel.

AMOS HARROLD.

Witnesses:
  SOLON C. KEMON,
  C. E. TRAINOR.